No. 814,602. PATENTED MAR. 6, 1906.
D. HEPP.
WORKMAN'S TIME RECORDER.
APPLICATION FILED JAN. 31, 1905.
3 SHEETS—SHEET 1.
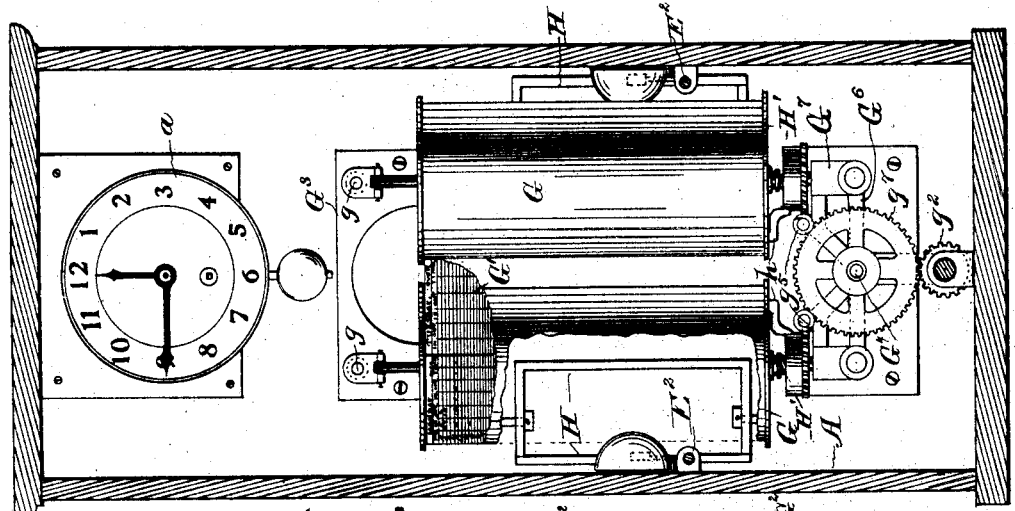
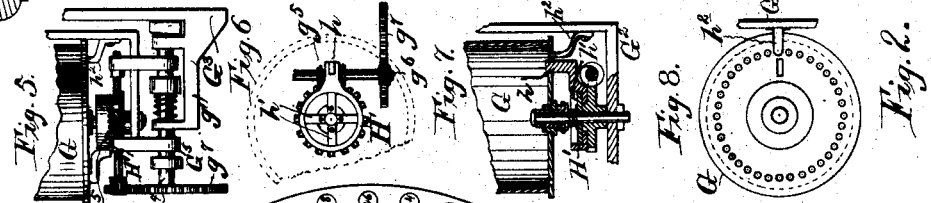
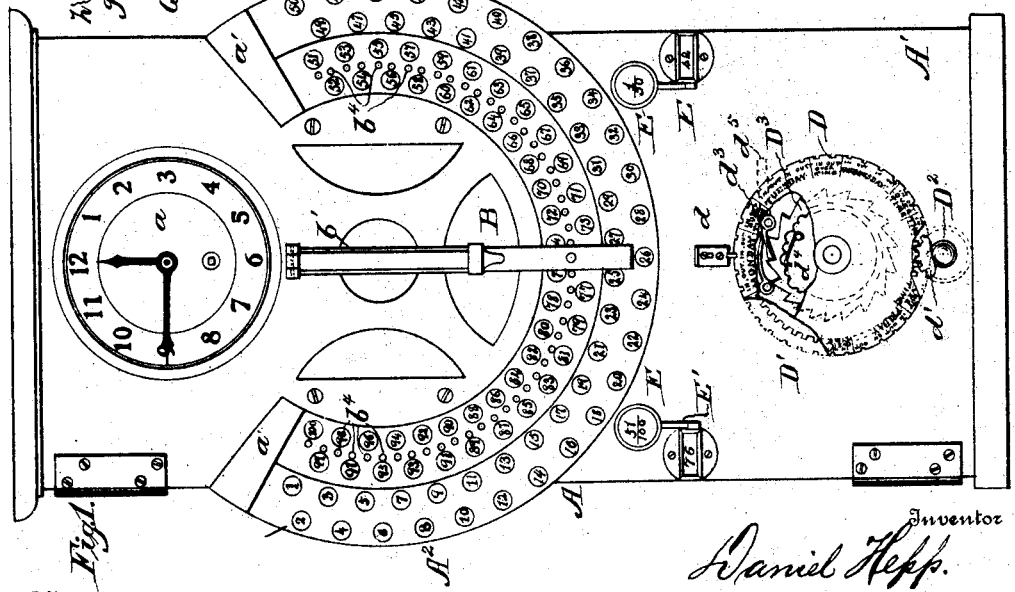
Inventor
Daniel Hepp.
Witnesses
J. C. Johnson
C. E. Hebb.
By Eugene W. Johnson,
Attorney

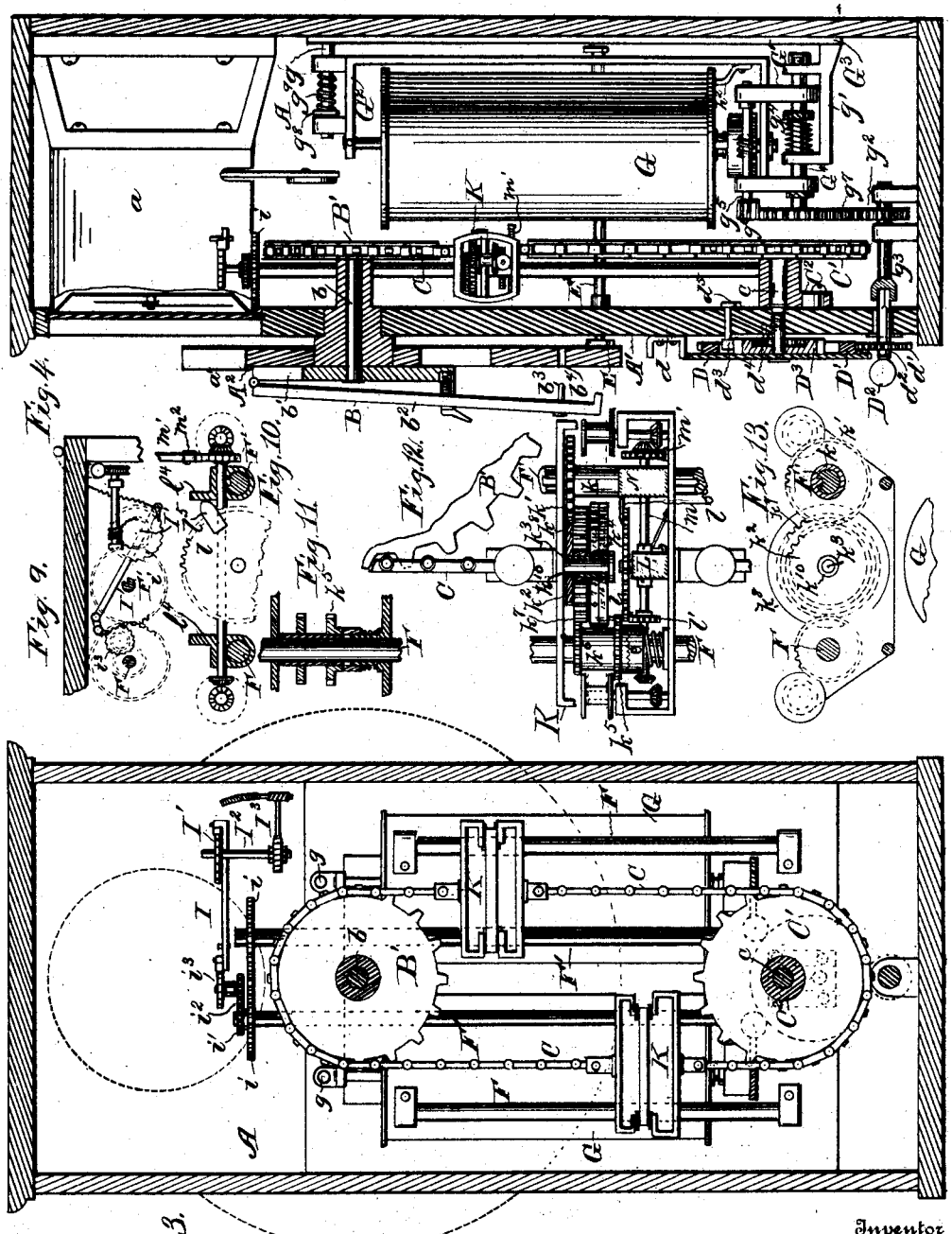

No. 814,602. PATENTED MAR. 6, 1906.
D. HEPP.
WORKMAN'S TIME RECORDER.
APPLICATION FILED JAN. 31, 1905.
3 SHEETS—SHEET 3.
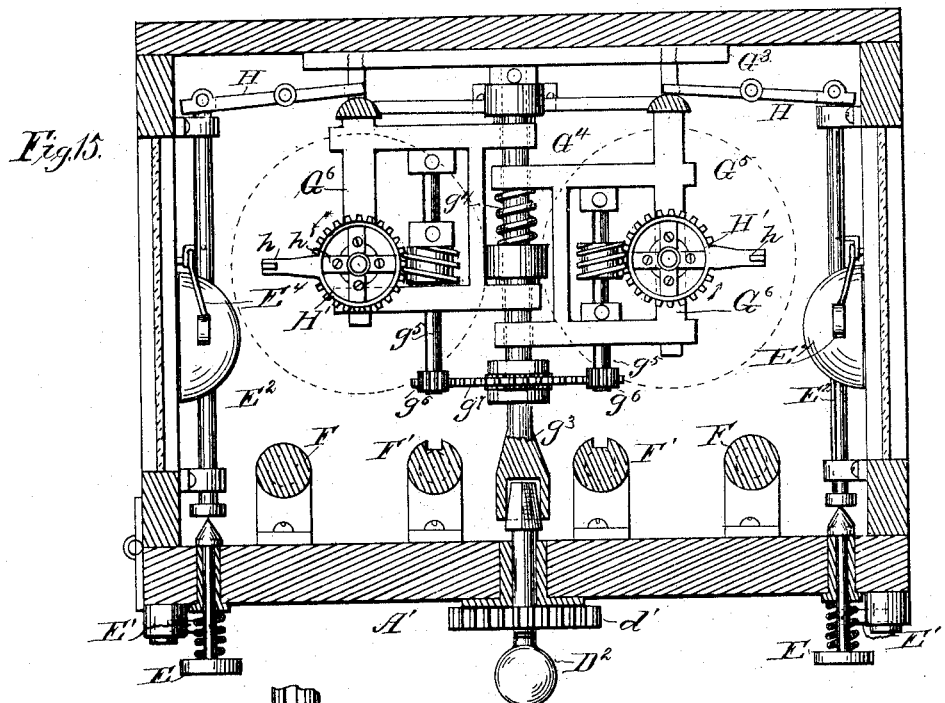
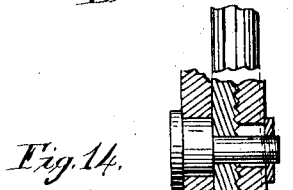
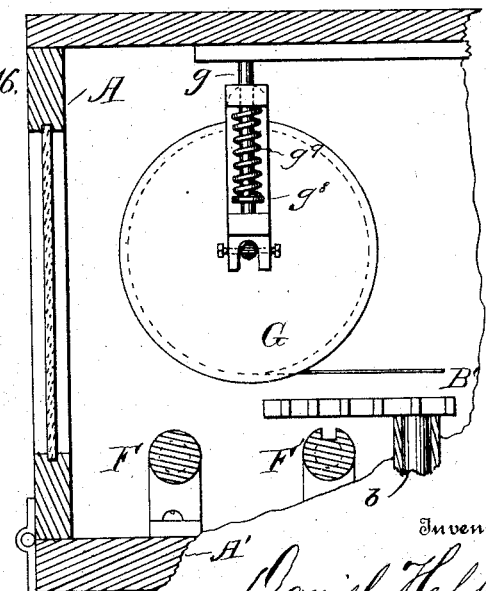

UNITED STATES PATENT OFFICE.

DANIEL HEPP, OF CHICAGO, ILLINOIS.

WORKMAN'S TIME-RECORDER.

No. 814,602.  Specification of Letters Patent.  Patented March 6, 1906.

Application filed January 31, 1905. Serial No. 243,480.

*To all whom it may concern:*

Be it known that I, DANIEL HEPP, a citizen of the United States, and a resident of Chicago, in the county of Cook and State of Illinois, have invented certain new and useful Improvements in Workmen's Time-Recorders, of which the following is a specification, reference being had to the accompanying drawings, forming a part thereof.

This invention relates to workmen's time-recorders. The purpose of the present invention is to provide a simple, compact, and low-priced recorder which is simple and effective in operation.

The present invention consists in the construction and combination of parts, which include a movable record-cylinder-supporting frame, a dial that is operated manually to place the cylinder so that a part of the record-sheet will be positioned to correspond with a particular notch or mark on the dial, a pointer movable over a number-plate, the pointer operating mechanism that either raises or lowers the printing mechanism, so that the same will be positioned by the pointer opposite the space on the record-sheet that corresponds with the number on the dial that is covered by the pointer, and means for moving the record-cylinder against the printing mechanism to make a record.

The invention further consists in the particular construction and combination of the parts whereby the printing mechanism is connected or driven by a clock, the impressions made upon the record-sheet being in hours and minutes, the printing mechanism being vertically movable in front of the record-cylinder when the pointer is placed over the workman's number, the construction being such that the printing mechanism is carried by the door or front of the casing and is entirely separable from the record-cylinders, which are maintained by the rear wall of the casing, such cylinders being manually adjustable to bring them in proper register with the time mechanism, as will be hereinafter set forth.

In the accompanying drawings, which illustrate one embodiment of my invention, and in which I have shown two record-cylinders and two printing mechanisms, thus duplicating the capacity of the recorder, Figure 1 is a front elevation, the dial or index-wheel being partly broken away to show the gear-wheel and ratchet-wheel attached thereto. Fig. 2 is a vertical section or front elevation with the door of the casing removed. Fig. 3 is a vertical section taken adjacent to the inner side of the door. Fig. 4 is a vertical section taken at right angles to the sections shown in Figs. 2 and 3 and through the center of the casing. Figs. 5, 6, 7, and 8 are detail views of parts connected with the record-cylinders. Figs. 9, 10, 11, 12, 13, and 14 are detail views of the printing mechanism. Fig. 15 is an inverted horizontal section, and Fig. 16 is a detail horizontal section taken below the clock.

Referring to the drawings, A represents a suitably-constructed casing, the front A' thereof constituting a door which is cut away at its upper portion or provided with a circular opening to expose the dial of a clock that is supported by the rear wall of the casing. The clock or time mechanism $a$ is of such construction that a pair of shafts or a single shaft may be driven therefrom.

The door A' carries a segmental-shaped number-plate $A^2$, and at the ends of the segments are stops $a'$, which project outward and limit the movement of a pointer B. The pointer B is secured to a shaft $b$, and said pointer comprises a part $b'$, that is rigidly attached to the shaft $b$, and an outer portion or member $b^2$, which is hinged to the part attached to the shaft and is pressed outward by a spring carried by the lower part of the member which is attached to the shaft. The longer member of the pointer B carries adjacent to its end which is farthest from the hinge an inward-extending pin $b^3$, so positioned and of such size that it may be passed into the perforations $b^4$ through the number-plate to insure the pointer being placed in proper register with a number on said plate.

The number-plate, as illustrated, is divided into two series, one series extending from one to fifty and the other, or inner series, from fifty-one to one hundred, and the perforations are so placed as to serve for one number on the outer series and for one on the inner series, independent push-buttons being used, one on each side of the casing, and two record-cylinders for duplicate printing mechanism. In practice one of the series of numbers may be dispensed with. A single printing mechanism is then used and only one record-cylinder, and when such is the case there is but one push-button present to be operated.

The shaft $b$, to which the pointer is attached, carries within the casing a sprocket-wheel B', a similar sprocket-wheel C' being attached to a stub-shaft $c$, that turns in a chaintightener $C^2$, that is adjustably secured to the inner side of the door A. C refers to a sprocket-chain made up in two sections to engage the sprockets, the chain having serrated links, as shown in Fig. 14, for connecting to the ends, by means of bolts, printing devices of the type shown by Figs. 12 and 14 of the drawings.

Centrally below the number-plate and to the front of the door there is attached a dial or index-wheel D, the same being divided or laid off into six equal divisions, each division representing a day. This dial is provided peripherally with thirty-six notches or recesses. The subdivisions of the dial bear the names of the days of the week, the word "Overtime," and in line with each notch the words "In" and "Out." The dial is held against movement by a vertically-movable slide or stop $d$, which may be raised to admit of the dial being turned. To the rear of the dial-plate there is attached a toothed rim or gear-wheel D', and with the same meshes a pinion $d'$, secured to a key-ended shaft $d^2$, the front end of said shaft having a knob $D^2$, by which the dial is turned when the stop is raised out of one of the peripheral notches therein. The knob also operates the record-cylinders, as will be hereinafter set forth, and the shaft carrying the knob and pinion has its bearing in the lower portion of the door. The dial D also carries a ratchet-rim $D^3$, having a series of outer ratchet-teeth, which are eighteen in number, said teeth being engaged successively by a spring-depressed pawl $d^3$, which may be attached to the door, and the inner notches of this ratchet-wheel are likewise engaged by a spring-detent $d^4$, also attached to the door. The pawl $d^3$ has an extension or tailpiece $d^5$, located against the inner side of the door A, by means of which the pawl may be raised when the door is opened. The dial D having thirty-six notches and the ratchet-wheel eighteen teeth on its outer rim, it will be obvious that the disk may be moved two notches before the pawl will engage the next tooth of the ratchet-wheel, and in practice the dial is moved only a distance equal to a portion of a ratchet to register "in" and "out" during the forenoon. The dial is moved a similar distance over the next ratchet-tooth for "in" and "out" in the afternoon, and likewise for "in" and "out" under the head of "Overtime." The dial may be set by an attendant, so that the person registering will merely have to see that it is properly set before he moves the pointer and pushes the button.

Below the number-plate on each side of the door are spring-projected push-buttons E, they being numbered to accord with the lowest numbers on each division of the number-plate. Each of the push-buttons E are connected by levers to counters E'. The inner ends of the stems of the push-buttons bear upon the forward ends of the sliding rods $E^2$, which when pushed inward move swinging frames so as to push forward a cylinder, so that the record-sheet will be pressed against the type-wheels of the printing mechanism.

Fastened to the inner side of the door of the casing A are guide and drive bars F F' for the printing mechanisms, the printing means being attached to the sprocket-chains C C. The central bars F' are each provided with longitudinal recesses and are driven by a suitable train of gearing, which is connected with the clock in such a manner that the printing-wheels will be moved synchronously with the hands of the clock.

The record-cylinders G G carry the record-sheet G', and said cylinders are journaled to a movable frame $G^2$, which is supported by the frame $G^3$, that is secured to the rear wall of the casing. The upper part of the back frame $G^3$ has forwardly-extending studs $g\ g$, and the lower portion of said frame is centrally provided with a forwardly-projecting arm or bracket $g'$, having upward-extending bearings, in which is journaled a centrally-located shaft $G^4$, said shaft having attached to its forward end a gear-wheel $g^7$, that is driven by a pinion $g^2$ on a shaft $g^3$, mounted in bearings attached to the bottom of the casing, and the forward end of this shaft has a socket for the squared end of the shaft $d^2$ when the door of the casing is closed. The forwardly-extending upper portions of the movable frame $G^2$ have lugs through which pass the studs $g\ g$, such studs having thereon collars $g^8$, against which bear springs $g^9$, the tendency of the springs being to move the frame $G^2$ rearward. The lower portion of the frame $G^2$ is moved rearward by the spring $g^4$, which encircles the shaft $G^4$ and bears against one of the upwardly-projecting portions of the bracket $g'$ and against one of the arms of the lower spider-frame $G^5$. The frames $G^5$ are constructed to provide laterally-extending arms $G^6$, which carry bearings $G^7$ for the lower supports of the cylinders G G. These frames also have bearings for shafts $g^5$, that carry broad pinions $g^6$, that may be placed in mesh with the gear $g^7$, such shafts $g^5$ driving, by means of the worms thereon, the supports for the cylinders which carry the record-sheet.

To move one of the record-cylinders forward for the purpose of printing thereon, one of the push-buttons E is pressed inward, moving rearward a rod $E^2$, tripping a bell-hammer $E^4$ to ring a bell carried by the casing and at the same time to move one of the swinging levers H upon its pivots, so that the inner end thereof will contact with the sliding frame $G^2$ and move the cylinders carried thereby toward the front and against the type-wheels of the printing mechanism.

To set the record-cylinder in proper position, the catch $d$ is raised. The knob $D^2$ is turned to set the dial or index-wheel so that the catch will engage the proper notch. The turning of the shaft $q^3$ actuates the pinion $q^6$ and the worm on the shaft $q^5$, such worm turning the wheels on the supports for the cylinders. By means of the gearing shown the record-sheet carried by the cylinders is placed to correspond with the notches in the periphery of the dial D. The lower ends of the cylinders, as shown in Fig. 8, each have a series of perforations which correspond as to number with the notches in the dial, and spring-studs $h^2$ are carried by the frame $G^2$, so that the ends of such studs will enter the perforations when the cylinders are lowered to operative position. The part H' for each cylinder has a friction device which includes spring-arms $h'$, (see Figs. 6 and 7,) such part consisting of a cup-shaped member having thereon a crank-arm $h$, the upward-extending portion thereof being adapted to enter a slot in the lower head of the cylinder. The cylinders have stud bearings or shafts which carry spring-arms $h'$ and a sleeve constructed to admit of the cylinder being raised manually for the purpose of adjusting the record-sheet to accord with the dial D. The detent $h^2$ will be moved out of engagement with the perforations in the head of the cylinders when one of the cylinders is raised or turned to set the same. The cylinders can only be set when the door is opened, and the shaft having the knob $D^2$ is disconnected from the shaft $q^3$. The stub-shafts which project from the upper heads of the cylinders engage the forwardly-projecting upper members of the frame $G^2$.

The upper ends of the shafts F' are each provided with intermeshing gear-wheels $i$ $i$, and one of such shafts carries a pinion $i'$, that meshes with a pinion $i^2$ on a suitably-supported shaft which also carries a ratchet-wheel $i^3$, the ratchet-wheel being driven by a pawl on lever I, which is actuated in one direction by a spring and in the other direction by a ratchet-wheel I' on a shaft $I^2$, such shaft being driven in any suitable manner from the time mechanism, and the driving-shaft $I^2$ may have worm-wheels or suitable gears and shafts to provide connecting means with a flexible shaft, a shaft of such type being used to admit of the door being opened and closed. The mechanism for driving the grooved shafts F' from the clock or time-keeping mechanism is best illustrated by Figs. 3, 4, and 9 of the drawings.

The printing mechanism (shown by Figs. 10, 11, 12, 13, and 14) is carried by frames K, that are maintained in sliding engagement with the shafts F F', such frames being attached to the chains C. Each of the frames have sleeves $k$ with feathers that enter the groove of the shaft F', and the sleeves carry gears $k'$, that are driven by the rotation of the shaft F', such gears $k'$ meshing with a central gear $k^2$, that is fast upon a sleeve $k^{10}$, carried by a supporting-pin $k^3$. The lower end of the sleeve $k^{10}$ has fast thereon the minute-disk $k^4$ of the printing mechanism. The disk $k^4$ has a depending pin for engagement once during each revolution with a tooth of a star-wheel $k^5$, such wheel being fast on a sleeve $k^6$, through which passes the shaft F. The upper end of the sleeve $k^6$ has thereon a gear which meshes with a gear-wheel $k^7$, mounted to turn on the sleeve $k^{10}$, through which is passed the pin $k^3$, and to such gear $k^7$ is attached the upper or hour disk $k^8$. A gear $l$ is mounted horizontally upon the upper end of a movable block L, and such gear meshes with a pinion $l'$ on a shaft $m$, that carries beveled gears which are adapted to mesh with similar gears, one at a time, on the shafts which carry the ribbon-spools. The gear $l$ has a projection or finger $l^5$, which abuts against projections $l^4$ (see Fig. 10) to move the sliding block L and the shaft $m$, having the beveled pinions, such shaft $m$ having in sliding engagement therewith a gear $l^7$ and a ratchet-wheel $m'$, that is moved one tooth each time the record-cylinder is moved toward the printing mechanism, the record-cylinder abutting against a spring-actuated bar $m^3$ and moving the same so that the pawl $m^2$ thereon will engage the ratchet and through said ratchet operate the ribbon-spools. To provide for setting the impression-wheels of the printing mechanism, the hub or sleeve of the gear $k^5$ has a clutch-face for engagement with the clutch-face of a ring which is vertically movable on the shaft F, the clutch-faces being held in contact by a spring, rotation being prevented by a pin which passes through a slot.

To imprint a time-record upon a record-sheet or upon a sheet carried by the cylinders when the disk is not properly set, the operator may raise the latch $d$ and then turn the knob D to place the dial in proper position—for instance, opposite the word "Monday" after twelve noon. When the dial is so adjusted, the record-cylinder will be moved to position the time-column thereon opposite or in line with the printing-wheel. The printing-wheels are turned by the clock to place the hour and minute disks to print the time indicated by the clock. The workman turns the pointer so as to be opposite his number on the number-plate. The movement of the pointer turns the upper sprocket-wheel and raises or lowers the printing mechanism to a point which corresponds with his number on the cylinder or record-sheet. Now by pushing upon the button E the cylinder is moved against the printing mechanism and a record is made. The same operation is repeated in leaving, the dial being then turned to "out," and provision is also made for recording "overtime."

The device may be modified as to the details of construction and arrangement of parts, and I may use a single cylinder, one printing device of any suitable type and the grooved shaft for driving the printing mechanism may be driven by a separate time mechanism, the leading feature in this case being to provide a vertically-movable printing mechanism that is raised and lowered by a manually-operated pointer, such printing mechanism operating in conjunction with a record-cylinder that is mounted so as to be moved by the operator against the printing mechanism.

Having thus set forth my invention, what I claim as new, and desire to secure by Letters Patent, is—

1. In a time-recorder, a manually-revoluble record-sheet-carrying cylinder, a horizontally-movable frame for supporting the cylinder, means adapted to engage the frame and move the cylinder carried thereby toward the front, springs for moving the frame rearward, a casing having at its front a swinging door, vertical guide-bars and a dial carried by the door, a sprocket-wheel actuated by the dial, time-imprinting mechanism in movable engagement with the guide-bars and a chain which engages the sprocket-wheel and to which is attached the time-printing mechanism, substantially as shown.

2. In a time-recorder, a casing having a swinging door, a rotary record-sheet support mounted upon a frame which is movable manually toward the door, a printing mechanism and means for raising and lowering the same carried by the door, and externally-operated means for bringing the record-sheet and the printing mechanism together, substantially as shown.

3. In a workman's time-recorder, a casing having a swinging door, a pointer, a dial-plate having a plurality of numbers thereon, a sprocket-wheel movable by the pointer, guide-bars having a printing mechanism in sliding engagement therewith, a chain connecting the printing mechanism with the sprocket-wheel, such parts being carried by the swinging door of the casing, a record-cylinder and means for moving the record-cylinder toward the printing mechanism, for the purpose set forth.

4. In a time-recorder, a casing having a swinging door, printing mechanism attached to the door and driven synchronously with a time-indicator, a setting-dial carried by the door, means for placing said dial in gear with a record-cylinder when the door is closed, a record-cylinder mounted on a movable frame and means for effecting a movement of the record-cylinder against the printing-wheel of the printing mechanism.

5. In a workman's time-recorder, the combination of the following instrumentalities, a number-plate, a pointer movable over the same and connected to a sprocket-wheel, guide-bars upon which a printing mechanism is maintained in sliding engagement, a sprocket-wheel below the sprocket-wheel attached to the pointer, chains which engage the sprocket-wheels and are attached to the printing mechanism, a movable frame supporting a record-cylinder, means for moving the record-cylinder toward the printing mechanism, a dial or index-wheel, means for turning the same, the turning means also engaging means for turning the record-cylinder, substantially as shown and for the purpose set forth.

6. In a workman's time-recorder, the combination with time mechanism, of a casing having at its front a swinging door, guide-shafts attached to the inner side of the door, printing mechanism mounted on the shafts, a pointer adapted to be manually operated to change the position of the printing mechanism on the guide-shafts, imprinting-wheels for the printing mechanism which are geared to be in synchronism with the time mechanism, a record-cylinder within the casing, gears connecting the record-cylinder with a dial or index-wheel, and a push-button for effecting a movement of the record-cylinder toward the printing mechanism.

7. In a workman's time-recorder, the combination of a casing having a hinged door for carrying printing mechanism and vertically-maintained guide-bars, a time mechanism connected to one of the guide-bars to turn the same and impel the printing-disks of the printing mechanism, a movable pointer for raising and lowering the printing mechanism, a revoluble cylinder which is adapted to carry a record-sheet, externally-operated means for turning the cylinder and other externally-operated means for moving the cylinder toward the printing mechanism.

In testimony whereof I have subscribed my name in the presence of two witnesses.

DANIEL HEPP.

Witnesses:
CHAS. HANSKER,
WM. L. CZOSCHKE.